May 1, 1923.

J. H. CABLE 1,453,914

FLUSH TANK VALVE

Filed July 8, 1919

INVENTOR.
BY John H. Cable

Victor J. Evans
ATTORNEY.

Patented May 1, 1923.

1,453,914

UNITED STATES PATENT OFFICE.

JOHN H. CABLE, OF MONTCLAIR, NEW JERSEY.

FLUSH-TANK VALVE.

Application filed July 8, 1919. Serial No. 309,269.

*To all whom it may concern:*

Be it known that I, JOHN H. CABLE, a citizen of the United States, residing at Montclair, in the county of Essex and State of New Jersey, have invented new and useful Improvements in Flush-Tank Valves, of which the following is a specification.

This invention relates to improvements in flush tank valves and its principal object is to provide an improved valved structure in which the possibility of leakage of the valve is reduced to a minimum.

Another object of the invention is to provide a valve having a relatively long valve stem guide.

A further object of the invention resides in the provision of a flush tank valve in which the valve element consists of a ball secured to the valve stem and adapted to engage a removable seat which when worn may be readily replaced.

Still another object of the invention is to provide a device in which the water pressure cooperates with the float in maintaining the valve in its closed position.

With these and other objects in view as will become apparent as the description proceeds, the invention consists in the novel construction, combination and arrangement of parts as will be fully set forth in the following specification, claimed and illustrated in the accompanying drawings in which:

Figure 1:
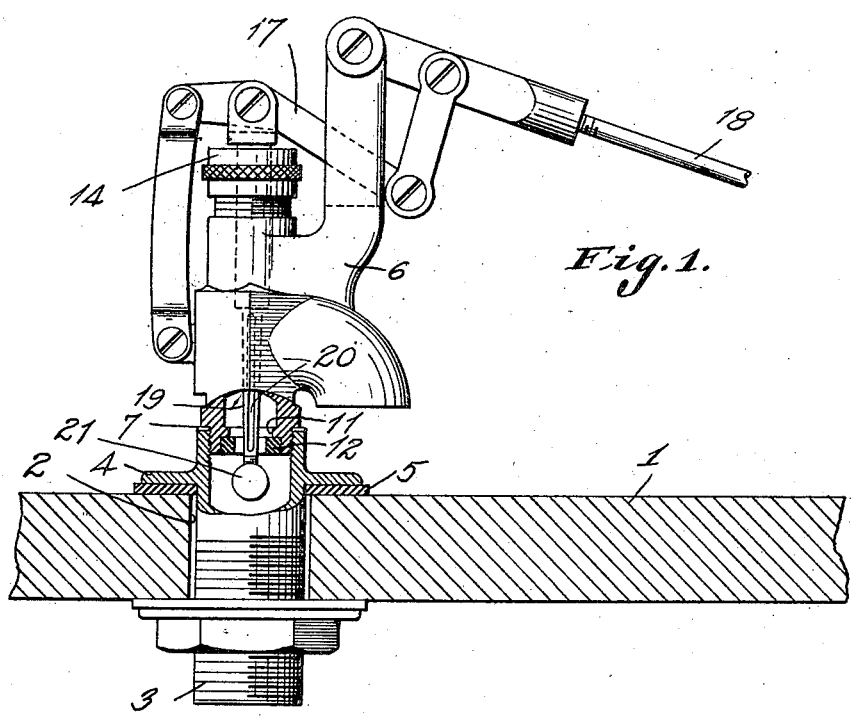
Figure 1 is a side view partly in section of a flush tank valve constructed in accordance with this invention.
Figure 2:
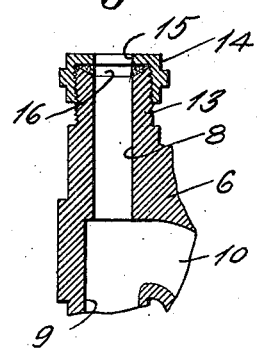
Figure 2 is a fragmentary sectional view through the valve body.
Figure 3:
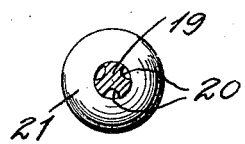
Figure 3 is an enlarged horizontal sectional view through the valve stem illustrating the valve secured thereto.

Referring to the drawings the numeral 1 designates the bottom of a flush tank provided with the usual inlet opening 2 through which the threaded valve connection 3 extends. Formed on the connection 3 adjacent its upper end is a flange 4 which acts as a clamping means for the packing gasket 5 by which a water tight joint is insured between the valve connection and the tank. The upper end of the connection 3 is provided with internal screw threads into which the lower end of the valve body 6 is threaded, a packing gasket 7 is arranged between the valve body and the connection 3 in order to provide a water tight joint. The valve body is provided with a longitudinal bore 8 the lower end of which communicates with a chamber 9 which in turn opens laterally into the outlet passage 10. Formed near the lower end of the chamber 9 is an inwardly extending annular flange 11 which forms an abutment against which a fibre washer 12 forming a valve seat rests. The upper end of the valve body is provided with a threaded extension 13 on which the cap 14 is threaded and this cap is provided with an opening 15 aligning with the bore 8 through which the valve stem extends. A suitable packing gland 16 is arranged in the upper end of the threaded extension 13 in order to insure a water tight joint around the valve stem. The valve body carries the usual lever and link mechanism 17 to which the float rod 18 is secured, and by means of which the valve is actuated.

The valve stem is of a diameter to slide through the bore 8 and yet to tightly fit the same. The lower end of the valve stem is provided with a reduced extension 19 having formed therein longitudinal grooves 20. The extreme lower end of the extension is threaded and the ball valve 21 is adapted to be threaded upon the stem. Upon upward movement of the stem by the link mechanism 17 the valve will contact with the seat 12 thus closing the passage through the valve body.

From the foregoing it will be evident that, as the tank becomes filled and the float rises, the link mechanism will move the valve stem upwardly and finally as the water in the tank reaches the desired height the ball 21 will seat against the seat 12 and thereby close the passage. In addition to the pull of the float on the valve stem to tend to hold the same closed, it will be obvious that the pressure of the water against the valve will hold the same securely against its seat until the level of the water in the tank is lowered at which time the weight of the float will overcome the pressure of the water on the valve thereby moving said valve to open position.

While in the foregoing has been shown and described the preferred form of this invention it is to be understood that certain minor changes in the construction, combination and arrangement of parts may be resorted to without departing from the spirit and the scope of the invention as claimed.

What is claimed as new is:

A flush tank valve comprising a body having a bore therein, a chamber communicating with said bore, an inlet and an outlet communicating with said chamber, a removable valve seat arranged at the inlet end of said chamber, a valve stem slidable in said bore, said valve stem having a reduced extension projecting through the chamber and below the valve seat, a removable globular member secured to the lower end of said reduced extension for co-operation with said valve seat, a plurality of vertical grooves arranged in the reduced extension, said grooves extending below the valve seat when the globular member is in a fully open position, a coupling having a water-tight connection with the body, and means responsive to the rise and fall of water comprising a lever which is pivotally connected to said stem and has pivotal connection with a pair of links one of which is pivoted to said body and the other of which is a floating link, and a pivoted float lever having connection with said floating links.

In testimony whereof I affix my signature.

JOHN H. CABLE.